(No Model.) 2 Sheets—Sheet 1.
G. A. TRESSLER.
QUILTING ATTACHMENT FOR SEWING MACHINES.
No. 581,632. Patented Apr. 27, 1897.
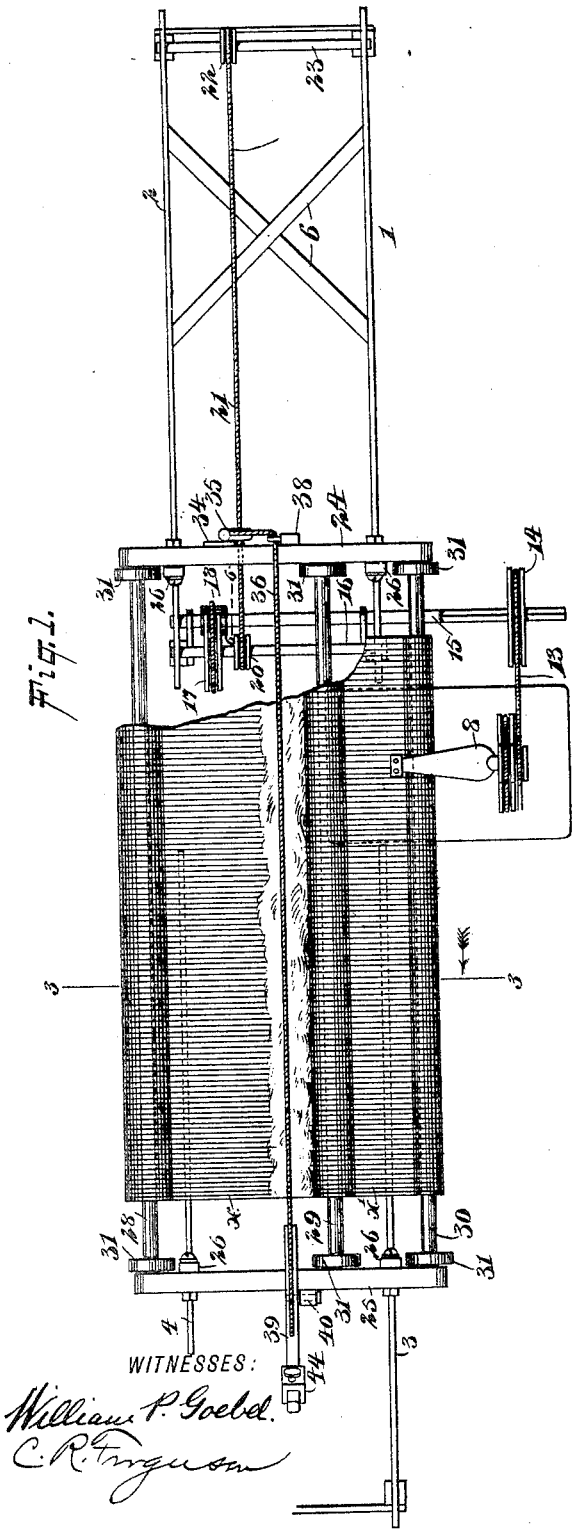
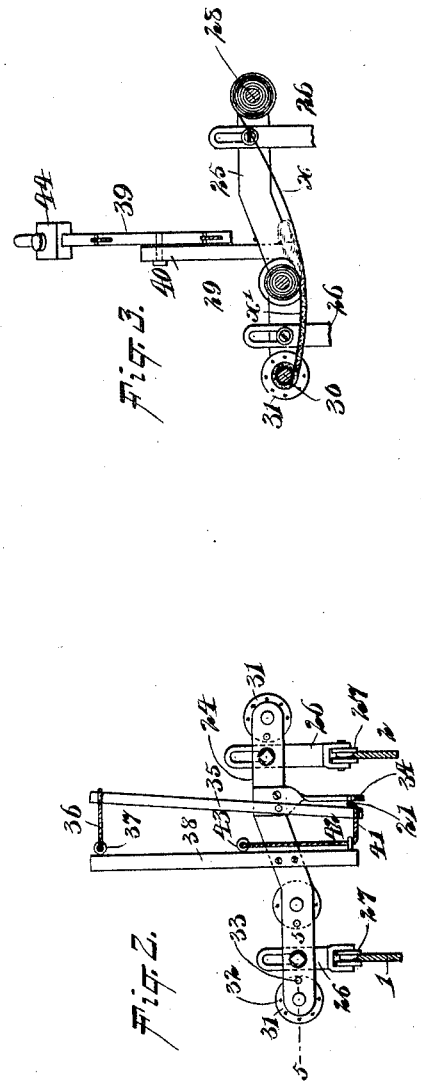
WITNESSES:
William P. Goebel
C. R. Ferguson
INVENTOR
G. A. Tressler
BY Munn & Co
ATTORNEYS.

(No Model.) 2 Sheets—Sheet 2.
G. A. TRESSLER.
QUILTING ATTACHMENT FOR SEWING MACHINES.
No. 581,632. Patented Apr. 27, 1897.
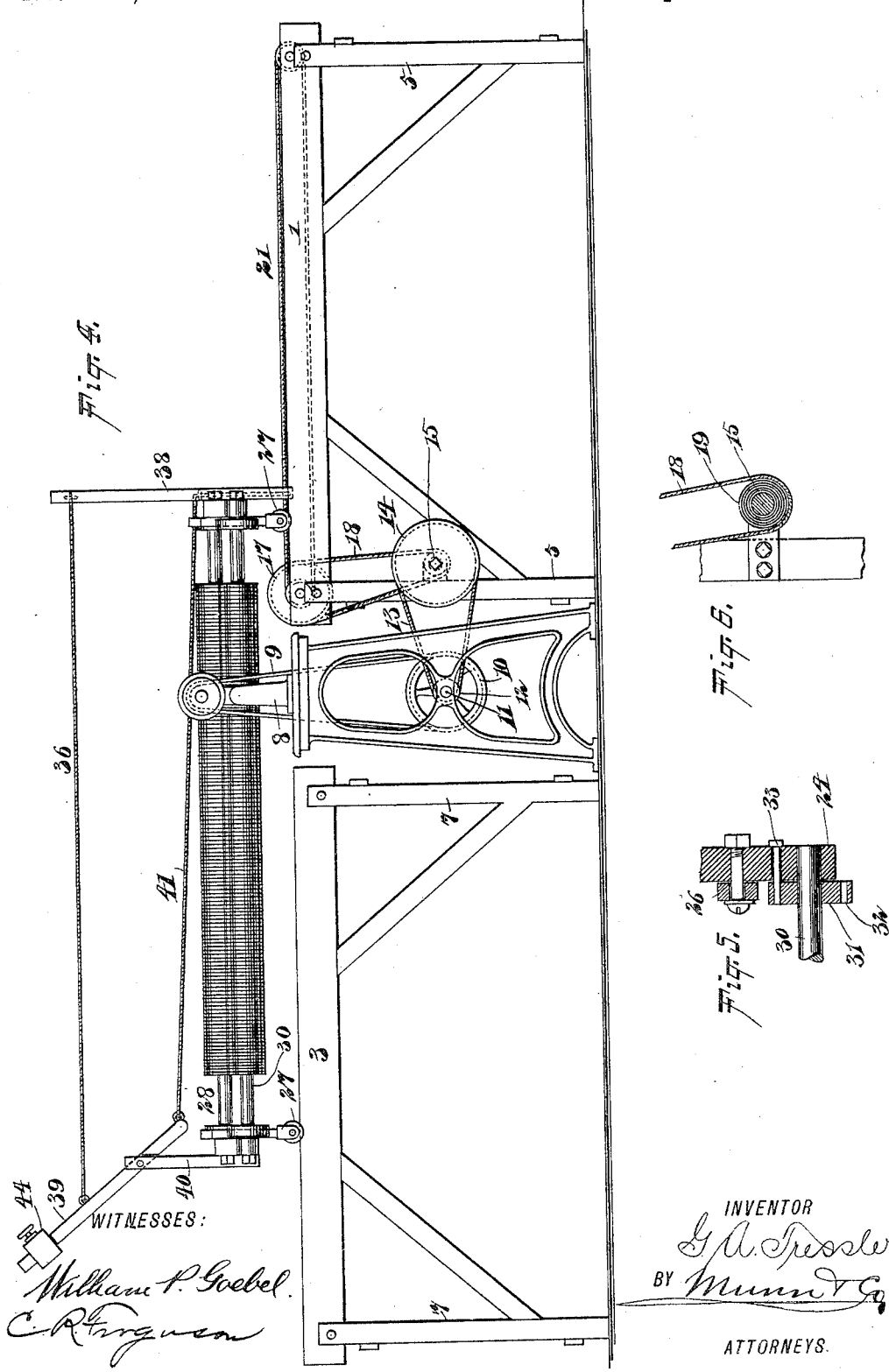
WITNESSES:
William P. Goebel.
C. R. Ferguson.
INVENTOR
G. A. Tressler
BY Munn & Co
ATTORNEYS.

UNITED STATES PATENT OFFICE.

GEORGE A. TRESSLER, OF AMERICUS, KANSAS.

QUILTING ATTACHMENT FOR SEWING-MACHINES.

SPECIFICATION forming part of Letters Patent No. 581,632, dated April 27, 1897.

Application filed July 14, 1896. Serial No. 599,128. (No model.)

*To all whom it may concern:*

Be it known that I, GEORGE A. TRESSLER, of Americus, in the county of Lyon and State of Kansas, have invented new and useful Improvements in Quilting Attachments, of which the following is a full, clear, and exact description.

This invention relates to certain improvements in quilting attachments for use in connection with sewing-machines, and has for its object to provide an attachment of this character of a simple and comparatively inexpensive nature which shall be light and durable in construction and shall be capable of being conveniently employed to enable a sewing-machine of the ordinary kind to be used for quilting.

I will describe a quilting attachment embodying my invention, and then point out the novel features in the appended claims.

Reference is to be had to the accompanying drawings, forming a part of this specification, in which similar characters of reference indicate corresponding parts in all the views.

Figure 1 is a top plan view of a quilting attachment embodying my invention. Fig. 2 is an end elevation of a portion of the device. Fig. 3 is a section on the line 3 3 of Fig. 1. Fig. 4 is a side elevation. Fig. 5 is a section on the line 5 5 of Fig. 2, and Fig. 6 is a section on the line 6 6 of Fig. 1.

The machine comprises pairs of guide-rails 1 2 and 3 4. The pair of guide-rails 1 2 are mounted on suitable legs 5 and may be braced laterally by transverse or cross braces 6. The pair of rails 3 4 are also mounted on legs 7. There is a space between the adjacent ends of the guide-rails 1 and 2 and the pair comprising the rails 3 and 4. This space is sufficiently wide to receive the frame of a sewing-machine 8, but as the two pairs of guide-rails are in line they practically form a continuous guide for a carriage moved thereon, as will be hereinafter described.

The sewing parts of the sewing-machine 8 are driven by a band 9, operated from a wheel 10 of the shaft 11, journaled in the sewing-machine 8. This shaft 11 may be operated in the usual manner. On the shaft 11 is mounted a sheave 12, from which a band 13 extends around a sheave 14, mounted on a shaft 15, having bearings in brackets extended from legs 5 of the guide-rails first mentioned. This sheave 14 is designed to rotate said shaft 15, but it is designed to have a longitudinal movement on said shaft to bring it in line with the wheel 10 of the sewing-machine shaft whenever the sewing-machine may be moved outward or inward with relation to the guide-rails, for a purpose hereinafter described. As here shown, the sheave 14 has an annular opening in its center, engaging on a similarly-shaped portion of the shaft 15. It is obvious, however, that the connection between the sheave 14 and the shaft 15 may be made by a feather and groove.

A shaft 16 has its bearings in the guide-rails 1 and 2, and on this shaft 16 is secured a sheave 17, around which a band 18 extends to the shaft 15, by means of which it is operated. As it may be desired to increase or diminish the relative speed between the shafts 15 and 16, I provide means for enlarging said shaft 15 or diminishing its size at the point engaged by the band 18. This may be done, as here shown, by winding a strip of textile or other fabric 19 around said shaft 15, this fabric thus forming a cover.

Mounted on the shaft 16 is a roller 20, over which an endless carrier-band 21 extends, the said carrier-band 21 also extending over a pulley 22, mounted on a shaft 23, having bearings in the guide-rails 1 and 2 at the end opposite that supporting the shaft 16. This carrier-belt 21 is designed to impart a movement to a carriage longitudinally of the guide-rails, as will be hereinafter explained. This carriage comprises end bars 24 25, which extend transversely of the guide-rails, and each bar has attached to it vertically-adjustable arms, in the lower ends of which are journaled flanged rollers 27, engaging on the guide-tracks.

Journaled in the end bars 24 25 are rollers 28, 29, and 30, the roller 28 being a feed-roller for the material $x$, forming the under side of the quilt, the roller 29 a feed-roller for the material $x'$, forming the upper side of the quilt, and the roller 30 serving as a take-up roller for the quilt as it is finished.

It will be seen that the roller 29 is arranged intermediate of the rollers 28 and 30 and somewhat closer to the roller 30 than to the roller 28. Each of the rollers is provided on opposite ends with a hand-wheel 31, by means of which the said rollers may be rotated. As it is necessary to hold said rollers stationary during the stitching operation, I find a convenient means therefor in providing each hand-wheel 31 with an annular series of holes, as indicated at 32, and adapted to receive a pin 33, passed through perforations in the end bars. It will be understood that all these rollers are to be operated by hand and one independently of another, whereby the tension on the quilt material may be changed by the increase of material on the take-up roller.

I will now describe a clutch mechanism for connecting the carriage with the carrier-belt 21. This clutch mechanism comprises a finger 34, rigidly attached to and extended downward from the end bar 24, and a movable clutch-arm 35, pivoted to said end bar 24, having its lower end extended adjacent to the finger 34 and having its upper end extended above said bar 24. From the upper end of the clutch-arm 35 a flexible connection 36 extends through an eyebolt 37, attached to a rod 38, which is secured to the bar 24 and extends above and below the same. This flexible connection 36 extends to a lever 39, fulcrumed on a post 40, extended upward from the end bar 25, the said connection being at a point above the pivotal point of said lever 39.

From the lower end of the arm 35 a flexible connection 41 extends through an eye 42 on the lower end of the bar 38, thence through an eye 43, secured to said bar 38 above the bar 24, and thence to a connection with the lever 39 at a point below its pivotal point. The lever 39 is adapted to swing in a plane longitudinally of the carriage, and it is provided on its upper end with a weight 44, which is preferably adjustable on said lever and held adjusted by means of a thumb-screw. By this construction it will be seen that by throwing the lever 39 to the angle illustrated in Fig. 4 the lower end of the clutch-arm 35 will be moved toward the finger 34, so as to tightly clasp the upper stretch of the endless band 21 between said clutch-arm and finger, and while in this position the carriage will be moved forward with the carrier-band. After reaching the end of its movement, by shifting the lever 39 to an opposite position the clutch-arm 35 will be moved out of engagement with the carrier-belt, and then the carriage may be moved back to its original position in order that a new row of stitches may be formed.

In operation the material $x$ for the lower covering of the quilt will be rolled upon the feed-roller 28, while the material $x'$ for the upper covering of the quilt will be rolled upon the roller 29. The cotton-batting held between the two covers is fed between the material $x\ x'$ at a point between the rollers 28 29, as indicated in Fig. 1. In starting the quilt the forward edges of the material $x\ x'$ are carried over from the rollers 28 and 29 and secured to the roller 30, the space between the materials being filled by a sheet of batting, and then, after making the engagement between the carriage and carrier-belt, the sewing-machine may be started, and during its operation the carriage, with the quilt, will be automatically carried forward to the completion of one row of stitches, after which the carriage is to be moved back to its starting-point, and then the sewing-machine may be moved inward or outward, as the case may be, and again started to form another row of stitching.

It is obvious that several rows of stitching may be made without changing the position of the quilt on the rollers.

From the above description it will be seen that the device is of an extremely simple and inexpensive nature and is especially well adapted for the purpose for which it is designed, since it permits a sewing-machine of ordinary construction to be employed for quilting and also for driving the quilting attachments; and it will also be obvious from the above description that the invention is susceptible of some modification without material departure from its principles and spirit, and for this reason I do not wish to be understood as limiting myself to the precise form and arrangement of the various parts as herein set forth.

Having thus described my invention, I claim as new and desire to secure by Letters Patent—

1. In a quilting attachment, the combination with a sewing-machine of guide-tracks, a carriage movable on said guide-tracks, feed-rollers and a take-up roller mounted on said carriage, an endless belt, gearing connecting said belt with the sewing-machine and by which the belt is driven, and a clutch mechanism carried by the carriage and engaging the said endless belt, substantially as specified.

2. In a quilting attachment, the combination with a sewing-machine of guide-tracks, a carriage movable along the same, feed-rollers and a take-up roller for the quilt material supported on the said carriage, an endless carrier-belt adapted to be operated from a sewing-machine mechanism, a clutch mechanism for connecting the carriage with the endless carrier-belt, the clutch comprising a finger extended downward from the carriage, a clutch-arm coacting therewith and pivoted to the carriage, a pivoted lever on the opposite end of the carriage, and flexible connections between said pivoted lever and the upper and lower ends of said clutch-arm, and gearing connecting the carrier-belt with the sewing-machine by which gearing the carrier-belt is driven, substantially as specified.

3. In a quilting attachment, the combination of guide-rails, a supporting-frame therefor, a shaft having journal-bearings in the frame, a sheave mounted to rotate with said shaft but adjustable longitudinally thereof, an endless carrier-belt passing around rollers mounted on shafts journaled in the frame, means for operating said endless belt from the first-named shaft, a carriage mounted on rollers engaging with the guide-tracks, a clutch mechanism for engaging said carriage with the endless belt, and rollers for supporting the material to be quilted mounted on said carrier substantially as specified.

4. In a quilting attachment, the combination of guide-tracks, a carrier for the material to be quilted, the carrier being mounted to move on said guide-tracks, an endless belt mounted on wheels or rollers supported by the guide-tracks, a clutch on the carriage and adapted to engage with the endless belt, said clutch comprising a finger rigidly fixed to the carriage and extended downward thereon and an arm pivoted at its center and adapted to coact with the finger, an arm extended upward from the carriage and guides on said arm, a lever pivoted to an arm extended upward from the opposite end of the carriage, a weight adjustably mounted on said lever, a connection extended from the upper portion of said lever through a guide on the arm extended upward from the front end of the carriage to the upper portion of the clutch-arm, and a flexible connection extending from the lower end of said clutch-arm through another guide on said arm to the lower portion of said weighted lever, substantially as specified.

GEORGE A. TRESSLER.

Witnesses:
ALICE M. LESH,
SAMUEL RALEY.